United States Patent [19]

Perko et al.

[11] Patent Number: 4,935,279
[45] Date of Patent: Jun. 19, 1990

[54] PULTRUDED COMPOSITE SIGN AND PROCESS THEREFOR

[75] Inventors: Jack E. Perko, Cedarburg; Gary J. Wirth, Milwaukee; Brian A. Foxgrover, Wauwatosa, all of Wis.

[73] Assignee: W. H. Brady Co., Milwaukee, Wis.

[21] Appl. No.: 283,984

[22] Filed: Dec. 16, 1988

Related U.S. Application Data

[63] Continuation-in-part of Ser. No. 148,824, Jan. 27, 1988, abandoned.

[51] Int. Cl.$^5$ .............................................. G09F 19/00
[52] U.S. Cl. ........................................ 428/74; 40/615; 40/616; 428/76; 428/195; 428/211; 428/284; 428/288; 428/290
[58] Field of Search .................... 428/75, 76, 211, 288, 428/294, 284, 195; 40/615, 616

[56] References Cited

U.S. PATENT DOCUMENTS

| | | | |
|---|---|---|---|
| 3,244,570 | 4/1966 | Boggs | 156/178 |
| 3,556,888 | 1/1971 | Goldsworthy | 156/73 |
| 4,061,435 | 12/1977 | Schmanski et al. | 404/10 |
| 4,252,696 | 2/1981 | McQuarrie | 260/16 |
| 4,342,168 | 8/1982 | Schmanski | 40/616 |
| 4,752,513 | 6/1988 | Rau et al. | 428/294 |
| 4,812,343 | 3/1989 | Kiekhaefer et al. | 428/35.6 |

FOREIGN PATENT DOCUMENTS

| | | | |
|---|---|---|---|
| 0234425 | 6/1961 | Australia | 40/615 |
| 0045007 | 8/1973 | France | 40/615 |

OTHER PUBLICATIONS

Brady Catalog 520-J, p. 17, admitted prior art, of W. H. Brady Co., 727 West Glendale Avenue, Milwaukee, Wis. 53201.
Brady Catalog No. ISD-1, pp. 4,6, admitted prior art of W. H. Brady Co., West Glendale Avenue, Milwaukee, Wis. 53201.
Brady Catalog No. ISD-2, page entitled "Sign Selector Guide" and p. 64, admitted prior art, of W. H. Brady Co., 727 West Glendale Ave., Milwaukee, Wis. 53201.
Glas-Tex Catalog C'82FV, p. 1, admitted prior art, of Glas-Tex, P.O. Box 368, Baldwin Park, Calif. 91706.
Glas-Tex brochure entitled "Glas-Tex Fiberglass Signs Graffitti Proof", admitted prior art, of Glas-Tex, P.O. Box 368, Baldwin Park, Calif. 91706.
Architectural Graphics, Inc. Catalog 10.11a/Arg, pp. 3, 14, dated 1978, of Architectural Graphics, Inc., 3 Koger Executive Center, Norfolk, Va. 23502.
"Fibrex Lifetime Graphics" Brochure, admitted prior art, of Identification Systems, Inc., Shelbyville, Tenn. 37160.

(List continued on next page.)

Primary Examiner—Marion C. McCamish
Attorney, Agent, or Firm—Quarles & Brady

[57] ABSTRACT

A sign is made by a pultrusion process by printing separate sign panels and attaching them to a fibrous component of the sign to make a longitudinally continuous sign panel subassembly which is beneath the surface of the sign. The sign panels are spaced apart in the subassembly by about the length of the sign and are fixed to the fibrous component prior to being pulled through a forming die. In the forming die, the subassembly is formed together with rovings, scrim resin and any other components of the sign into the cross-section of the sign. The sign panel subassembly saturates with the resin so that it blends in with the rest of the sign except for identification matter printed on it and is permeable to allow gases to escape as the resin cures in the die. The sign takes on its desired cross-sectional shape in the die and is cut off at its desired length after it exits the die. The sign panel may be on either side of the subassembly, and the subassembly may be beneath a surface layer. The fibrous component of the subassembly may be continuous, or may be in sections spaced apart and affixed to the sign panels. A double sided sign may be made by attaching pairs of sign panels side by side to a fibrous component which can be folded to display the sign panels on both sides of the sign.

23 Claims, 7 Drawing Sheets

OTHER PUBLICATIONS

"Modulite . . . Custom Signs" and Modulite . . . Safety Signs Brochures, admitted prior art, of Reinforced Plastics, Inc., John Fitch Industrial Park, Warminster, Pa. 18974.

"SGL Graphics-Virtually Indestructible Fiberglass Embedment Signs" brochure, admitted prior art, of SGL Industries, Inc., John Fitch Industrial Park, Warminster, Pa. 18974.

"Pannier Graphics-Virtually Indestructible Fiberglass Embedment Signs" brochure, admitted prior art, Bulletin No. PG100/110/15M of The Pannier Corporation, John Fitch Industrial Park, Warminster, Pa. 18974.

Meyer, *Handbook of Pultrusion Technology* (1985), pp. 1–93.

U.S. Patent Office Action mailed Nov. 4, 1988 for U.S. patent application Ser. No. 07/148,824 and the references cited therein as follows: a. Rau et al. U.S. Pat. No. 4,752,513 issued Jun. 21, 1988; b. Schmanski U.S. Pat. No. 4,342,168 issued Aug. 3, 1982; c. Australian Patent Specification No. 234,425, publisehd May 26, 1960; d. French Patent No. 71.45007, dated Aug. 1973.

PULTRUDED COMPOSITE SIGN AND PROCESS THEREFOR

This is a continuation-in-part of U.S. Pat. application Ser. No. 07/148,824 filed Jan. 27, 1988, now abandoned.

BACKGROUND OF THE INVENTION

1. Field Of The Invention

This invention relates to a sign made of a composite material by a pultrusion process.

2. Discussion Of The Prior Art

Composite materials are well known for making many different types of items. A composite typically comprises a reinforcing component, which may be in the form of fibrous strands or woven or non-woven sheet, encapsulated in a resinous binder. Typical applications of composites are boats, automobile body parts, springs, beams, conduit, fishing rods, tennis rackets, and skis. Many different types of resins have been used in making composites including thermosetting resins, thermoplastics and elastomer resins. Many different types of fibrous materials have also been used including glass, aramid, carbon, thermoplastic fibers and hybrid fibers.

Composite signs have also been made. Processes for making composite signs include compression molding and pultrusion. In compression molding, the layers of the sign, including a sign panel layer with the sign identification matter on it, are laid up in a mold and the mold is filled with a resin under pressure which encapsulates the layers when it sets up.

Pultrusion has been used for producing products of a constant cross-sectional area in a continuous process. One or more longitudinally continuous fibrous components of the product are pulled through a resin bath just prior to being pulled through a forming die in which the resin cures and the product takes on the desired cross-sectional shape. When the cured product exits the die, it is cut off to provide the desired length of the product.

Pultruded products bearing legends have been made by printing a surface layer prior to pulling it into the die, or by printing on, or affixing a sign panel to, the exterior of the product. However, the surface layer in pultrusion is usually an open, non-woven material which does not provide a good printing surface, particularly for small characters or detailed graphics. When the surface layer is molded as part of the pultrusion, legibility and definition of a legend printed on the layer has been a problem. Also, the diameter of a print wheel for printing the surface layer is impractical for long products or where the print length is short but the print repeat length is long. Printing or attaching a sign panel on the surface of the pultrusion subjects the identification matter to damage such as weathering and scratching.

SUMMARY OF THE INVENTION

The invention provides a pultruded sign having an encapsulated legend which overcomes the above disadvantages. Separate sign panels bearing the desired identification matter are prefabricated and then joined to a fibrous component of the sign to make a longitudinally continuous sign panel subassembly. The subassembly is then pulled through a forming die in which a resinous component sets up to form the desired cross-section of the sign while the longitudinally continuous subassembly is held taut to guide the sign panel in the die.

In one form, the sign panel is beneath a fibrous longitudinally continuous surface layer component which is adjacent to the viewing surface of the sign. The sign panel may be affixed either to the surface layer, or to another longitudinally continuous fibrous component which is beneath the surface layer. In either case, the surface layer and any resin pooled on the surface layer between the sign panel and the viewing surface become translucent in the final sign so that the identification matter is readily visible from the viewing surface.

In an alternate form, the sign panel is affixed against an exterior surface of the surface layer. In this form, the identification matter is somewhat more distinct, and it is preferred to secure the leading edge of the sign panel to the surface layer to prevent interference with the die. It is also useful in this aspect to provide an additional protective coating over the sign in the area of the sign panel.

In another form, the fibrous component can be made in sections, with the sections and the sign panels attached end to end and alternating to make the longitudinally continuous sign panel subassembly. The end connections may be arranged so as to minimize interference with a pultrusion die or to provide a thicker layer of resin over the sign panel.

In another aspect, the sign panel is made of a permeable sheet material to allow gases to escape through it from inside the sign as the resin sets up. The sign panel can also be made of a material which saturates with the resin so that the background of the identification matter, or any unprinted parts of the sin panel such as characters which are reverse printed, become the same color as the resin. Thus, except for the printed parts, the sign panel blends in with the rest of the sign so that it appears substantially invisible.

In another aspect, the sign can have identification matter on each of two sides. The legends are defined by one or more sign panels which are attached to a longitudinally continuous fibrous component so that the component can be folded along its length to display each legend on one side of the sign.

DESCRIPTION OF THE DRAWINGS

The present invention is described below, as required by 35 U.S.C. §112, in such full detail as to enable those skilled in the art to practice the invention and also to set forth the presently-contemplated best modes for its practice, all by reference to the following drawings in which.

DETAILED DESCRIPTION OF THE PREFERRED EMBODIMENT

Figures 1, 2, 4, 6:
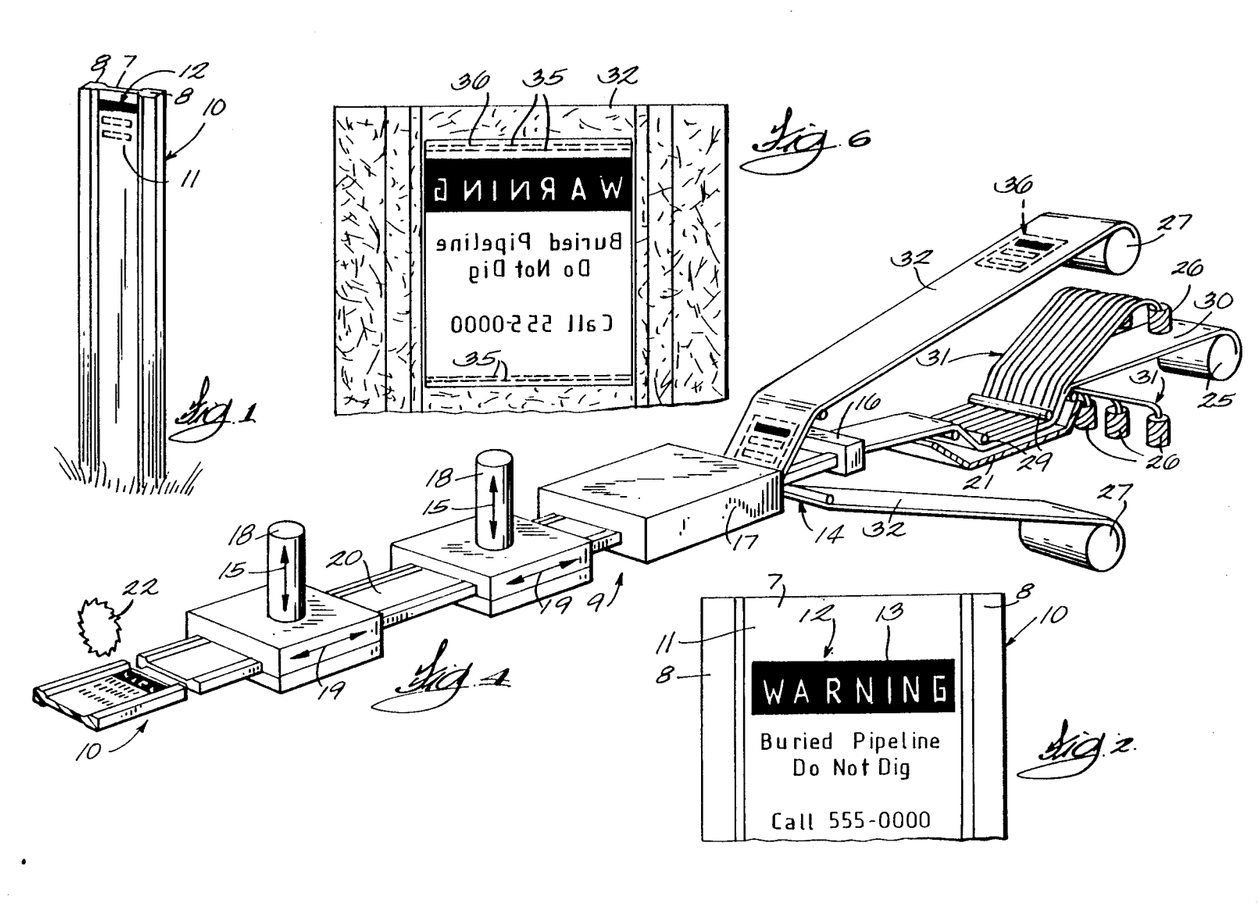
FIG. 1 is a perspective view of a sign of the invention erected in the ground.
FIG. 2 is a detail view of a portion of the sign of FIG. 1 displaying a legend.
FIG. 4 is a schematic view of the pultrusion process of FIG. 3.
FIG. 6 is a view taken from the plane of the line 6—6 of FIG. 5.

Referring to FIGS. 1 and 2, a sign 10 of the present invention is in the form of a stake which can be implanted in the ground. In the case of the sign 10, the sign bears identification matter 12, also sometimes referred to as a legend, warning of a buried pipeline. As used herein, "identification matter" or "legend" includes all indicia, including but not limited to alpha-numeric characters, symbols and other graphics.

The identification matter 12 is integral with the sign 10 beneath a viewing surface 11. The word "WARNING" is reverse printed, being defined or outlined by a printed background 13, and the characters "Buried Pipeline', "Do Not Dig" and "Call 555-0000" are defined by printed letters. The background and letters are typically printed with a dark ink, such as black, and the stake is made using a light colored resin, such as yellow or orange, for good contrast with the printing. As hereinafter described, the color of the resin used for the sign will show through the letters of the word "WARNING".

The present invention was specifically developed for the manufacture of the sign 10 by the pultrusion process. Moreover, the sign 10 if desired may have flexural characteristics which enable it to withstand being run over by a vehicle and thereafter return to a vertical position without damage, which characteristics are best imparted to the sign 10 by the pultrusion process. The sign 10 is also adapted to the pultrusion process because it has a constant cross-section, which in the exemplary embodiment is I-beam shaped having a central web 7 with flanges 8 along its longitudinal sides. The sign 10 may be made in any desired length as hereinafter described.

Figure 3:
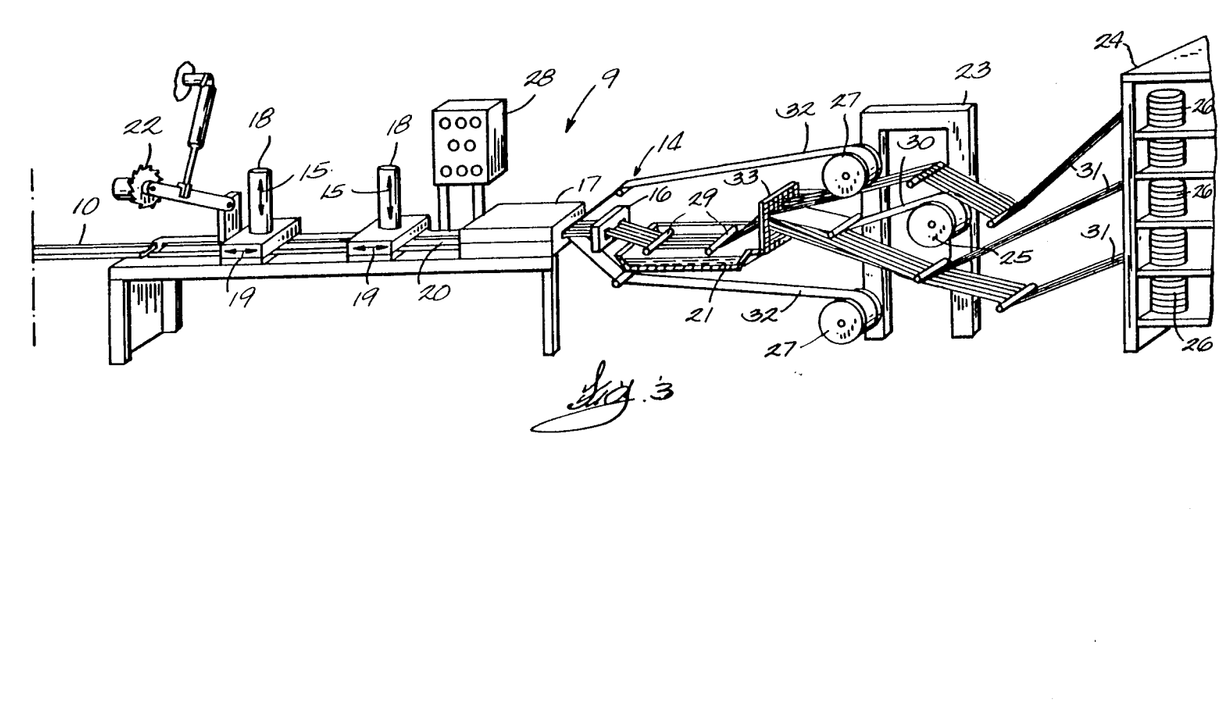
FIG. 3 is a perspective view of a machine for performing a pultrusion process.

A pultruder machine 9 to perform the pultrusion process to fabricate the sign 10 is illustrated in FIG. 3 and a schematic illustration of the process is shown in FIG. 4. In pultrusion, longitudinally continuous components generally designated 14 and a plastic resin (not shown) are pulled through a heated die 17 in which the resin cures to form the sign in the selected cross-sectional shape. Pulling is accomplished by reciprocating pullers 18, downstream of the die 17, which are synchronized to continuously pull the components 14 through the die 17. The pullers 18 reciprocate vertically as indicated by arrows 15 as well as horizontally as indicated by arrows 19 to alternatively grasp a cured product 20 emerging from the die 17 and pull it through the die 17. Because the longitudinally continuous fibrous components 14 make up the product 20, the pullers 18 also operate to continuously draw the components 14 from their respective supply rolls or spools. A control panel 28 is provided for an operator to adjust and monitor the pultrusion process.

A web of scrim 30, unwound from roll 25 (FIGS. 3 and 4) and rovings, 31 unwound from spools 26, are inner longitudinally continuous fibrous components 14, and are directed through a resin bath 21 of plastic resin (not shown) by suitable rollers 29 in the bath 21. The inner components 30 and 31 are then pulled through a preforming fixture 16, which strips excess resin from the components 30 and 31 and arranges them generally in the cross-section of the sign 10.

Two webs of surface veil 32 make up outer longitudinally continuous fibrous components 14 in the sign 10. The webs of surface veil 32 are unwound from upper and lower rolls 27, meet the resin wetted inner components 30 and 31 at the mouth of the die 17, and are pulled through the die with the inner components. The resin carried into the die 17 by the components 30 and 31 cures in the heated die and continuous cured product 20 having a cross-section in the shape of the inner cavity of the die 17. After exiting the die 17, and on the downstream side of the pullers 18, the cured product 20 is cut off at the length desired for the sign 10 by a saw 22.

The scrim roll 25 and surface veil rolls 27 are mounted on a mat rack 23, and the roving spools 26 are supported on a roving rack 24 upstream of the mat rack. A single layer of scrim 30 extends across the width of the sign 10 at approximately the middle of its thickness. The scrim 30 is a nonwoven open mesh reinforcement material made with continuous filament yarns and provides reinforcement in the longitudinal and transverse directions for strength in those directions.

The surface veil 32, also known as surface mat, is the longitudinally continuous fibrous layer closest to each external surface of the sign 10. It is a lightweight continuous strand mat of about ½ ounce or less per square foot, which may be made of thermoplastic polyester fibers, fiberglass or other material, and extends across the width of the sign 10 substantially at the surface thereof. The webs of veil 32 are not pulled through the bath 21 but soak up resin from the excess resin at the entrance of the die 17. This results in a resin rich surface for the sign 10 which avoids exposed fibers and provides a good surface finish. In the final sign 10, the veil 32 is suspended in the hardened resin matrix and is substantially translucent or transparent when looking toward an external surface of the sign along which veil 32 is arranged.

Figure 5:
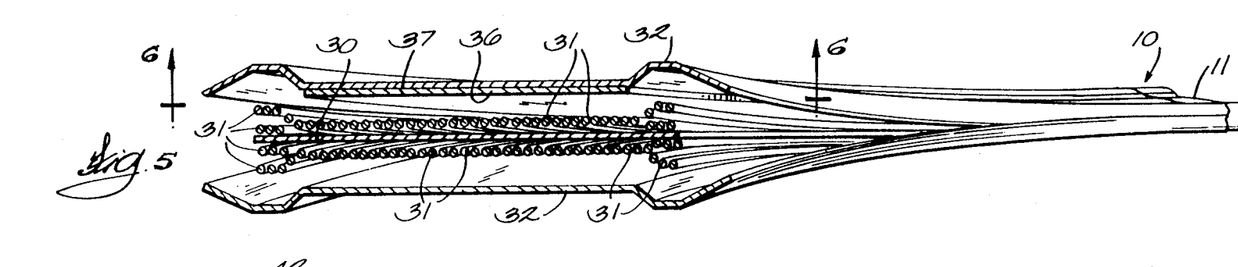
FIG. 5 is an enlarged schematic view of the sign of FIG. 1 illustrating the construction of the nonresinous components of the sign.

Two separate webs of surface veil 32 are used in the embodiment of FIG. 5. Each web follows the exterior shape of the sign 10 on one side thereof and the webs overlap at the edges. Thus, except at the ends of the sign 10, the scrim 30 and rovings 31 are enveloped by the webs of veil 32.

The rovings 31 in the preferred embodiment are unbraided continuous strands or bundles of strands, each strand being made up of unbraided fiberglass filaments, and provide substantial tensile strength which is needed to pull the cured product 20 through the die 17. Other types of rovings are also available which may be suitable for use in a sign of the invention, such as a type which is a single bundle of filaments. Thus, "rovings" refers to any longitudinally continuous collection of filaments or of bundles of filaments.

The rovings 31 are positioned between the webs of scrim 30 and veil 32. The rovings 31 are distributed throughout the sign 10 in proportion to cross-sectional area. Distribution of the rovings 31 in the sign 10 is controlled by feeding them through a grid 33 (FIG. 3) upstream of the bath 21.

As shown in FIGS. 4–6 and 9, the identification matter 12 is incorporated in the sign 10 using a printed sign panel 36. The sign panel 36 is not longitudinally continuous webs or strands like the scrim 30, rovings 31 and surface veil 32, but rather is a discrete element typically less than half the length of the sign 10, although it can extend further.

The sign panel 36 has a printed surface 37 which bears the identification matter 12, and the sign panel 36 is joined to a web of veil 32 with the printed surface 37 contacting the innermost surface of the veil 32. FIG. 6 is a view looking at the backside of the sign panel 36 (i.e. the side opposite from the viewing surface 11) and of the veil 32 and the identification matter 12 is shown as if the sign panel 36 was transparent (even though it is more likely to be translucent or opaque), the identification matter 12 being on the surface 37 which is opposite from the backside of the sign panel 36. Thus, from the viewing surface 11, the identification matter 12 is to be visible to an observer through the veil 32. This is not a problem because the surface veil 32 and resin pooled thereon are translucent in the final sign 10 so that the identification matter 12 can be seen clearly.

The sign panel 36 should be made of a sheet material which allows good print definition. If the unprinted portions of the sign panel 36 are to blend in with the rest of the sign 10, the sign panel 36 material may also be saturable with the resin. As such, viewed from outside of the viewing surface 11, the material of the sign panel 36 is the same color as the resin. Thus, reverse printing, such as the letters of the word "WARNING", are also the same color as the resin of the sign.

The material from which the sign panel 36 is made is also permeable so that gases generated while the resin is setting up and curing can pass through the sign panel rather than become trapped inside the sign 10. Materials which meet these criteria include saturable paper, various types of fabric and other natural or synthetic sheet materials.

Figures 14, 15:
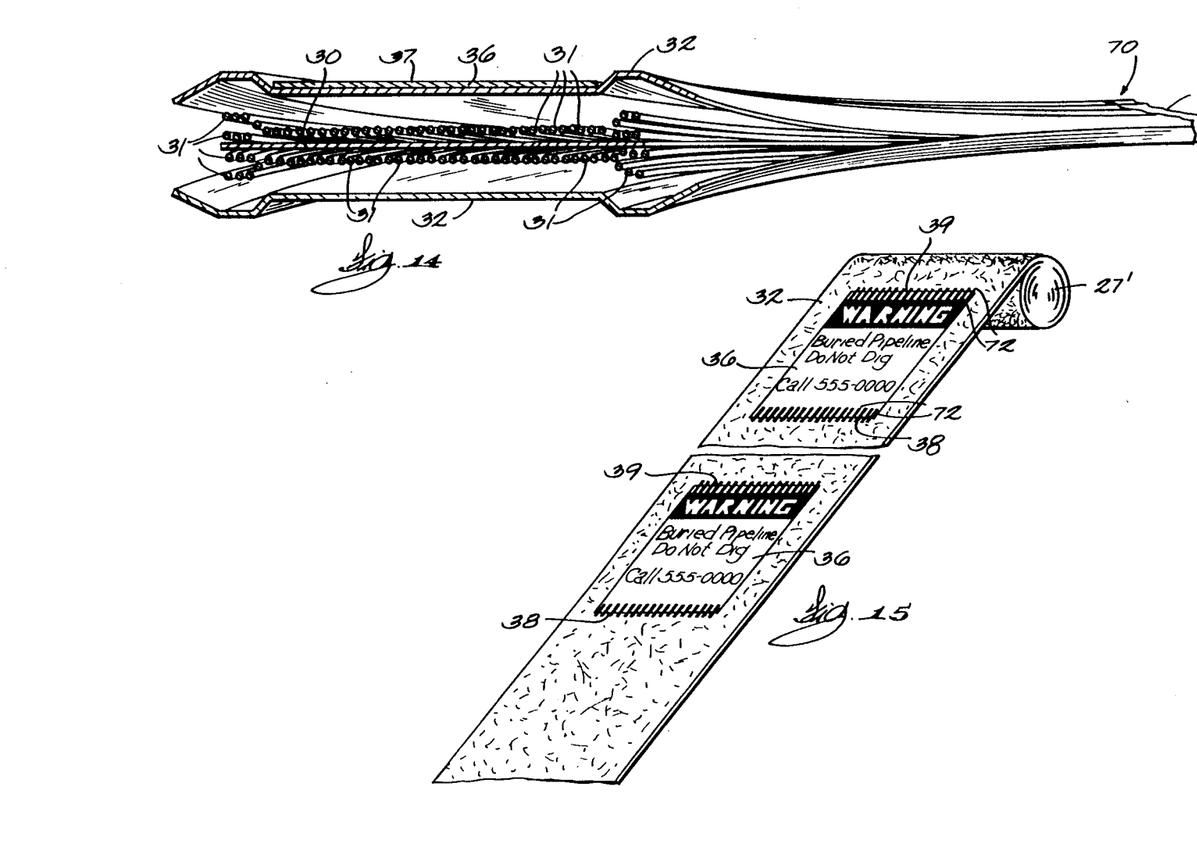
FIG. 14 is a view similar to FIG. 5 but illustrating a fifth embodiment of a sign of the invention.
FIG. 15 is a perspective view of a sign panel subassembly for the sign of FIG. 14.

The sign panel 36 is affixed to the veil 32 so that the sign panel 36 and veil 32 can be held taut to control the alignment of the veil 32 and sign panel 36 during the pultrusion process and especially in the die 17. Tension is maintained throughout the pultrusion process upstream of the grid 33 by applying torque to the rolls of veil 32 which opposes metering out of the webs of veil 32. Torque may also be applied to the other rolls to provide alignment control. Such alignment control is necessary to properly register the identification matter 12 and the webs of veil 32 of the sign 10. Under tension, the side to side alignment and surface depth of the veil 32 can be controlled. Positioning the sign panel 36 on the innermost surface of the veil 32 protects the sign panel from dragging directly on the die 17, which may otherwise tend to strip the sign panel off or distort the legend, although it is possible to position the sign panel 36 on the exterior surface of the veil 32 as explained below in connection with sign 70 (FIG. 14).

In the sign 10, the sign panel 36 has leading 38 and trailing 39 edges (FIGS. 4, 6 and 9) which are sonically welded to the surface veil 32 as indicated by dashed lines 35. As alternatives, the sign panel may be sonically welded to the veil along its side edges or only along its leading edge 38. Sonic welding is possible as long as one or both of the materials used for the sign panel 36 and the surface veil 32 are made of a thermoplastic material. If neither are thermoplastic, the entire face of the sign panel 36 can be adhered to the veil 32 with a heat seal adhesive, or the sign panel 36 can be sewn, glued, stapled, or otherwise appropriately secured to the veil 32. The sign panels 36 affixed to the veil 32 thereby make up a sign panel subassembly which is a longitudinally continuous component layer.

In some applications, it may be most desirable to use a heat seal lacquer or other heat sensitive adhesive which is compatible with the resin binder and has a melting temperature above the gel point temperature of the resin within the heated die 17 to secure the sign panel 36 to the veil 32. Thermoplastic polyesters, polyamides and the like may be used for the heat seal lacquer or heat sensitive adhesive. The heat seal lacquer or adhesive secures the sign panel 36 on the veil 32 long enough to fix the sign panel's position in the sign 10 but can melt and react with the resin binder while in the die 17 so that the adhesive joint will not be visible in the final sign 10. Other attachment means such as sonic welding, sewing or stapling may otherwise be visible in the final sign 10 to some extent.

Figures 9, 10:
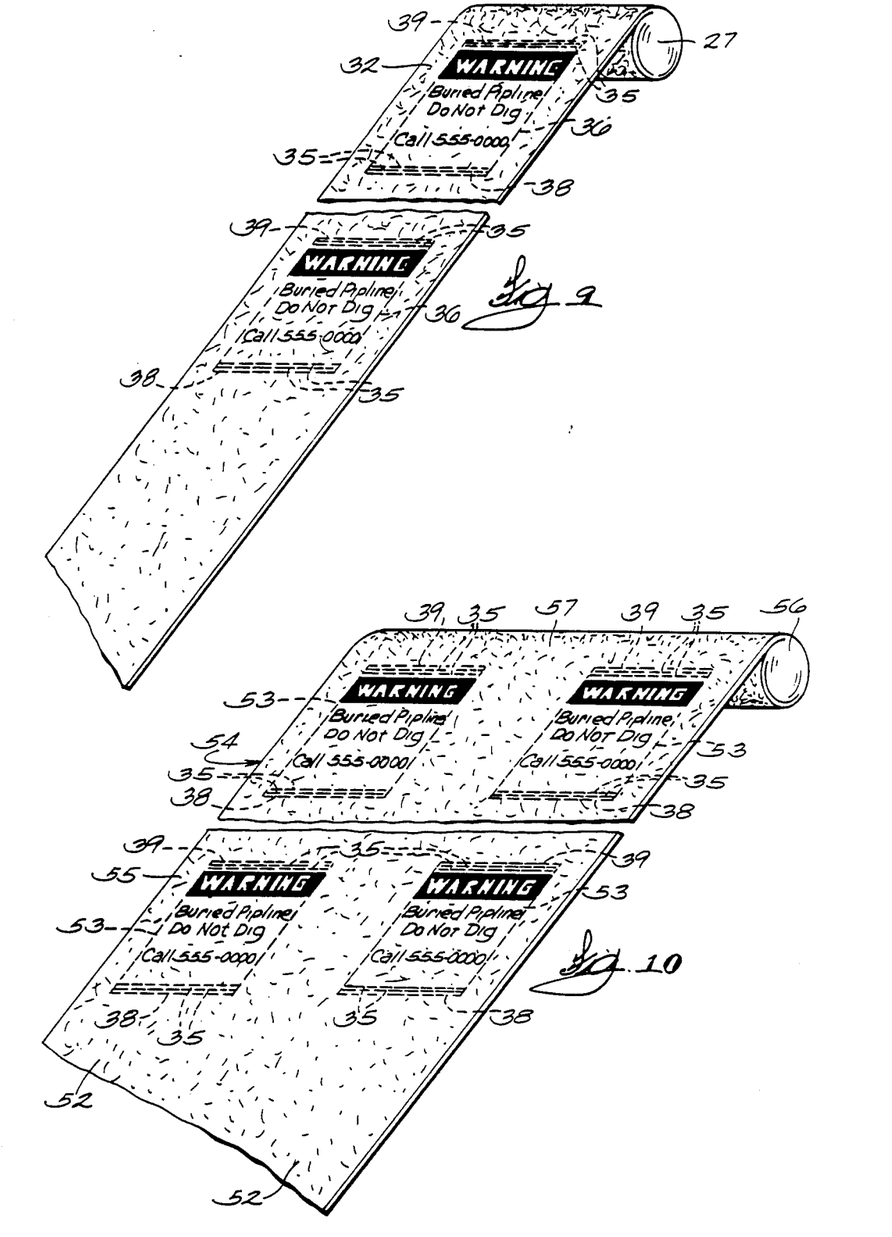
FIG. 9 is a perspective view of a sign panel subassembly for the sign of FIG. 1.
FIG. 10 is a perspective view of a sign panel subassembly for the sign of FIG. 8.

As shown in FIG. 9, in the exemplary embodiment, a plurality of sign panels 36 are attached to the web of veil 32 in a separate subassembly process. The sign panels 36 are attached to the veil 32 "off-line" with the veil 32 under the same amount of tension as that used in the pultrusion process and with a spacing of approximately one sign length between corresponding locations on them (i.e. from the leading edge of one sign panel 36 to the leading edge of the next), plus a correction for the thickness of cut removed by the saw 22 when an individual sign 10 is cut off from the continuous length of cured product 20. The sign panel subassembly comprising the web of veil 32 and the sign panels 36 is then threaded into the pultruder and synchronized with the cut off operation.

Also, more than one sign panel 36, each panel bearing different legends, can be attached to the veil 32 to make up each sign 10. Moreover, the subassembly process of affixing the sign panels 36 to the veil 32 can be performed on-line upstream of the veil being pulled into the die 17.

Figure 7:
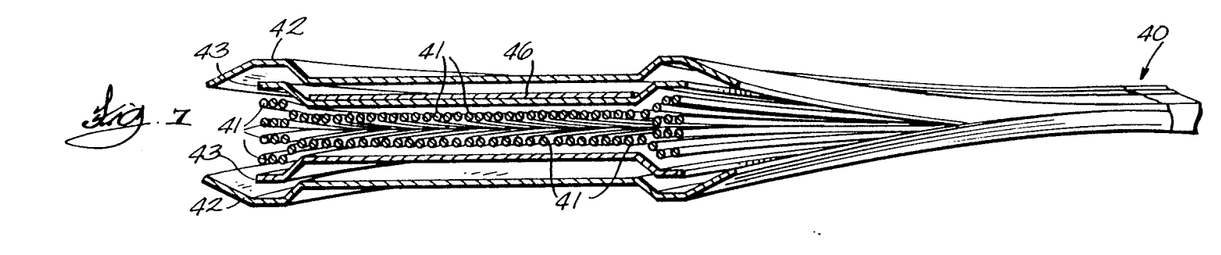
FIG. 7 is a view similar to FIG. 5 but illustrating another embodiment of a sign of the invention.

FIG. 7 illustrates a sign 40 as a second embodiment of the invention. This embodiment is also pultruded, but it has a different construction of its component layers. In this embodiment, rovings 41 are in the middle of the cross-section with reinforcing mat 43 bordering the rovings from side to side and surface veil 42 enveloping the mat 43 and the rovings 41. The mat 43 is a reinforcing material comprising a web of nonwoven continuous strand mat of multi-directional fiberglass or other suitable reinforcing fibers. A sign panel 46 is between the mat 43 and a surface veil 42 with its identification matter facing the surface veil 42. The sign panel 46 is affixed to the mat 43 by adhesive bonding, sonic welding, sewing or other appropriate means. However, the sign panel 46 also can be secured to the surface veil 42 rather than to the mat 43. Analogously, referring now to FIG. 5, the sign panel 36 of sign 10 can be attached to the rovings 31 or to some other longitudinally continuous fibrous component adjacent to the veil 32 in the sign 10.

Figure 8:
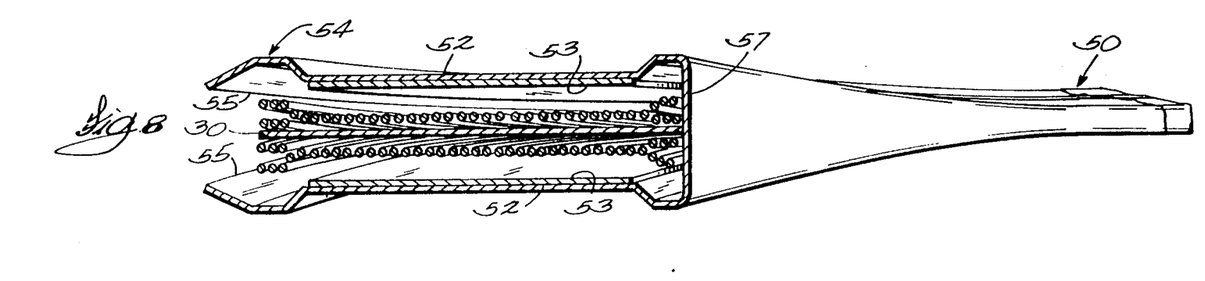
FIG. 8 is another view similar to FIG. 5 but illustrating a third embodiment of a sign of the invention.
Figures 11, 12:
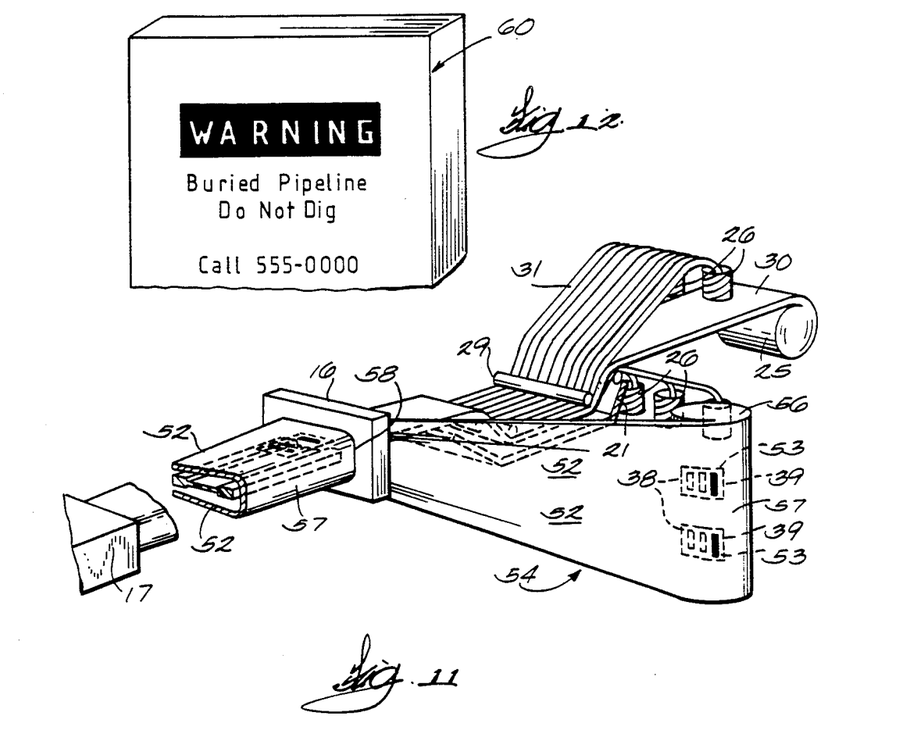
FIG. 11 is a schematic view illustrating a method for feeding a veil for the third embodiment in a pultrusion process.
FIG. 12 is a perspective view of a fourth embodiment of a sign of the invention.

FIG. 8 illustrates a sign 50 as a third embodiment of the present invention. This embodiment is also pultruded and is of a construction of layers similar to that of the sign 10. However, surface veils 52 on either side of the sign 50 are integral and opposite sides of a single web of veil 54 which is unwound from a roll 56 (FIGS. 10 and 11) and is folded around the edge of the sign 50. Sign panels 53 are attached to the veil 54 next to each other in the manner described above and as shown in FIG. 10. Opposite longitudinal edges 55 of the veil 54 overlap one another at one edge of the sign 10 and a central longitudinal panel 57 of the veil traverses the other edge. As schematically illustrated in FIG. 11, one way of threading the veil 54 into a pultruder is from the side, with the axis of the roll 56 vertical. The veil 54 can be threaded through a U-shaped slot 58 formed around the opening in the preforming fixture 16 which preshapes the resin-wetted scrim 30 and rovings 31.

In the embodiment shown in FIG. 8, a mat of approximately the width of the veil 54 can be provided beneath the veil 54 (or beneath the two separate veils in the embodiments of FIGS. 5 and 7) and the sign panels 53 attached to the mat, with the mat folded to display the sign panels on opposite sides of the sign. It is also possible to print two legends side by side on a single piece of sign panel material and fold the material along with folding of the longitudinally continuous component to which it is attached (e.g., a veil or mat) to display identification matter in registry with one another on each side of the sign.

Figure 13:
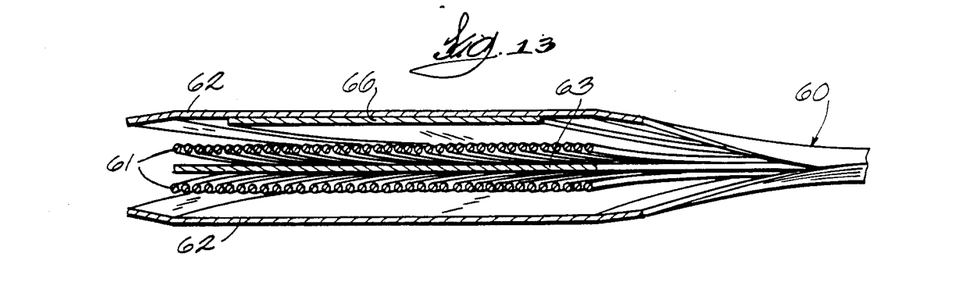
FIG. 13 is a view similar to FIG. 5 but illustrating the embodiment of FIG. 12.

It is also possible to make a sign of the invention in various shapes and sizes. For example, referring to FIGS. 12 and 13, a sign 60 of the invention is illustrated which has a rectangular construction. The relationships of a veil 62, sign panel 66, rovings 61 and scrim 63 to one another will be recognized as the same as for the elements of the sign 10 shown in FIG. 5. Other relationships such as those described in connection with the signs 40 and 50 of FIGS. 7 and 8 could also be incorporated into the sign 60. Moreover, other shapes for a sign of the present invention may also be used. Further examples include signs having arcuate, elliptical, circular, square, triangular, L-shaped, T-shaped or U-shaped cross-sections.

It has also been found that sign panels can be attached against the exterior surface of an outermost longitudinally continuous component as shown in the embodiment illustrated in FIG. 14. As stated above, positioning the sign panel beneath the veil as in the embodiments of FIGS. 5, 7, 8 and 13 helps protect the sign panel as it enters the die 17 and also provides a resin rich surface above the sign panel. However, it has been found possible to attach the sign panel to the exterior surface of the outermost longitudinally continuous component so that the die does not interfere with it to any significant extent, and, if desired, to treat the viewing surface of such a sign so as to improve its resistance to weathering and abrasion.

FIG. 14 illustrates a sign 70 which is similar to the sign 10 of FIG. 5, but which has the sign panel 36 attached against the exterior surface of the veil 32 rather than against the interior surface. The sign panel 36 is attached to the veil 32 in the sign 70 in the same way as in the sign 10, e.g. by sewing, gluing, stapling or other appropriate securing means and with the identification matter 12 facing the viewing surface 11 of the sign. It has been found that the securement of the sign panel 36 should be right at or overlap the leading edge 38 (See roll 27' for sign 70 in FIG. 15). This is especially preferred for the sign 70 to help prevent the leading edge 38 from being rolled back by or caught on the die 17 as it enters the die 17. As shown in FIG. 15, in the roll 27' for the sign 70, the sign panel 36 is attached against the exterior surface of the veil 32 by a series of equally spaced apart longitudinally oriented ultrasonic weld lines 72. The weld lines 72 overlap the leading edge 38, as well as the trailing edge 39, to help prevent the edges from being rolled back by or caught on the die 17.

Even with the sign panel 36 on the exterior surface of the longitudinally continuous components as in sign 70, a layer of resin forms over the sign panel 36 which encapsulates and protects the sign panel 36. In some applications, however, such as if the sign 70 is to be subjected to weathering and/or abrasion, additional protection may be desired. This can be provided by applying a transparent layer over the viewing surface 11. For this purpose, a clear acrylic lacquer applied over the viewing surface 11 in the area of the sign panel 36 has been found to provide good results in resistance to weathering.

Because no fibrous components lie between the sign panel 36 and the viewing surface in the sign 70, the sign 70 has improved print definition over the signs 10, 40, 50, 60 or any sign made by positioning the sign panel beneath a longitudinally continuous component. Obviously, positioning the sign panel on the exterior surface of the outermost longitudinally continuous component may be applied not only to the construction of sign 10, but also to other sign constructions embodying aspects of the invention such as those of the signs 40, 50 and 60.

Figures 16, 17:
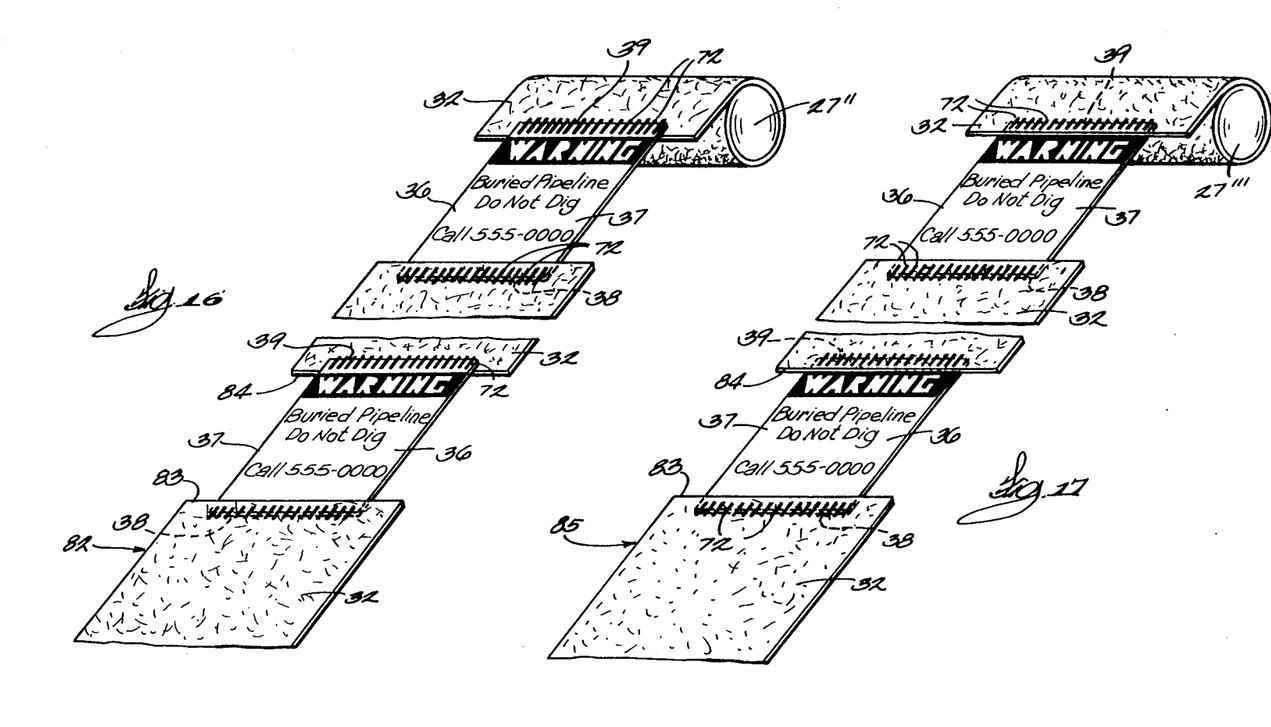
FIG. 16 is a perspective view of an alternate sign panel subassembly for a sign of the invention.
FIG. 17 is a perspective view another alternate sign panel subassembly for a sign of the invention.

FIG. 16 illustrates an alternate sign panel subassembly 82 for use in signs of the invention. The sign panel subassembly 82 may be used as the outermost longitudinally continuous component in signs of the invention. The roll 27" of component 82 may be substituted, for example, for the roll 27 for the sign 10 or for the roll 27' for the sign 70. It should also be apparent that the teachings of FIGS. 16 and 17 could also be applied to make a two sided sign like sign 50 or a sign of almost any cross-sectional shape.

The component 82 is made up of sections of veil 32 and sign panels 36 which are attached end to end to one another in any of the ways disclosed above for affixing the sign panels 36 to the veil 32 in the embodiments previously described, i.e. by sonic welding, sewing, gluing, stapling, or other appropriate securement. Each individual section of veil 32 and each sign panel 36 is not longitudinally continuous but is discrete and discontinuous, and the sign panel 36 sections and veil 32 sections are affixed to one another serially in alternating fashion. Only the entire subassembly 82 made up of the sections of veil 32 affixed to sign panels 36 is longitudinally continuous. The subassembly 82 may therefore be pulled through a pultrusion die in a continuous process for producing signs of the invention.

The effect achieved in signs made using the component 82 is similar to that achieved in the sign 70. Since there is no veil or other fibrous component between the sign panel 36 and the viewing surface of the sign, and particularly between the printed surface 37 of the sign panel 36 and the viewing surface of the sign, the identification matter is somewhat more defined. Also, it may be desirable for signs made with this embodiment to apply a protective transparent layer over the viewing surface of the sign in the area of the sign panel, as was suggested for the sign 70.

The component 82 is made with the leading edge 38 of each sign panel 36 placed beneath the trailing edge 83 of each section of veil 32 so that at the leading edge 38, the sign panel 36 is against the inside surface of the veil 32. The trailing edge 39 of each panel 36 is above the leading edge 84 of the successive section of veil 32. The trailing edge 39 is therefore against the outside surface of the veil 32. This minimizes opportunities for the leading edges 38 and 84 of the panels 36 and sections of veil 32, respectively, to become caught or drag on the die 17.

FIG. 17 illustrates a longitudinally continuous component or sign panel subassembly 85 which is similar to the component 82 and is wound in a roll 27'''. The subassembly 85 differs from the subassembly 82 because it is made with both the leading 38 and the trailing 39 edges of the sign panel 36 beneath the sections of veil 32.

Although the leading edges 84 of the veil 32 sections may have a tendency to be rolled slightly back as they enter a pultrusion die, positioning both edges 38 and 39 against the inside surface of the veil may have the advantage of increasing the thickness of resin between the panel 36 and the viewing surface of the finished sign. By placing the sign panel 36 against the inside of the veil 32 sections, a gap approximately equal to the thickness of the veil 32 (approximately 0.007 inches in the preferred embodiment) may be formed between the surface 37 of the panel 36 and the adjacent, facing surface of the die 17. Resin may pool in this gap to produce a thicker resin layer over the panel 36 for additional protection against weathering and abrasion. Of course, it would also be possible to apply an additional protective layer over signs made using the subassembly 85 in the area of the sign panel if desired.

A pultruded sign of the invention can be made from various combinations of longitudinally continuous components and resin binders. The fibrous components may be unidirectional such as the rovings 31, multidirectional, such as the veil 32 and mat 43, or bidirectional, such as the scrim 30, fibrous components, or a combination of two or more of such components. Rovings typically form the principal component of the fibrous materials in a pultruded sign but are generally combined with a smaller percentage of bidirectional or multidirectional fibrous materials in order to impart transverse strength characteristics. On a weight basis, a pultruded sign of the invention may comprise about 20% to 75% by weight of fibrous materials and sign panels and the balance the cured resin binder.

For most commercial uses, unsaturated polyester resin is used as the polymeric component of the binder, although some other types of curable polymers can also be used. Thus, a typical formulation for a resin binder suitable for the practice of the invention will comprise a major portion of unsaturated polyester resin, a styrene monomer for cross-linking the polyester resin, and an appropriate catalyst or blend of catalysts. The formulation may also include small amounts such as on the order of 0% to 3% by weight of pigment, mold release agent, and a UV inhibitor (particularly if the sign is to be used outdoors), and from 0% to 30% by weight of an inorganic filler such as calcium carbonate, kaolin clay, talc, alumina trihydrate and the like. Other ingredients can be mixed with the formulation for the resin binder to impart specific properties. A wide variety of combinations of fibrous components and formulations for the resin binder are well known in the pultrusion art and can be used for practice of this invention; sources of such information include technical literature available from suppliers of resins for pultrusion and from manufacturers of pultrusion equipment, and technical literature such as the book titled *Handbook of Pultrusion Technology*, R. W. Meyer, (Chapman & Hall, 1985).

EXAMPLE 1

A specific embodiment of the sign 10 of the invention made as described above is as follows:

| Nominal Dimensions: | |
|---|---|
| Width: | 3.8" (web 7 width: 3.1", flat width of each flange 8: .25", width of each angled transition from web 7 to flat of flange 8: .1") |
| Web 7 thickness: | .155" |
| Flange 8 thicknesses: | .370" |
| Length: | 66" |

The particular scrim 30 used is a fiberglass material with a weight of 1.6 oz. per square yard. The surface veil 32 is 0.75 oz. per square yard thermoplastic polyester surface veil. Forty-seven rovings 31 (PPG type 1064) having a yield of 123 yds./lb. are used on each side of the scrim 30 for a total of ninety-four rovings 31 in the sign 10.

The formulation for the resin binder used for sign 10 is:

| | Percent by Weight |
|---|---|
| Unsaturated Polyester Resin[1] | 64.66% |
| Styrene Monomer | 14.23 |
| Cellulose Solid Particulates average particulate size of 30 microns[2] | 9.31 |
| Catalyst (1) t-butyl perbenzoate, a high temperature catalyst . . . 0.65% (2) bis (4-t-butylcyclohexyl) peroxydicarbonate, a low temperature catalyst . . . 0.26% | 0.91 |
| Inhibitor 1,4-benzoquinone[3] | 0.08 |
| UV Stabilizer 2-(2'-hydroxy-5' methylphenyl) benzotriazole | 0.44 |
| Pigment orange pigment | 0.70 |
| Mold Release Agent organo-phosphate compound[4] | 0.36 |
| Reactive Liquid Elastomer Polymer butadiene-acrylonitrile copolymer[5] | 9.31 |
| | 100.00% |

[1]Stypol ™ 40-2304 sold by Freeman Chemical.
[2]Celufil ™ 13292 sold by United States Biochemical Corporation.
[3]As 2% solution in styrene.
[4]Synpro ™ 1301 sold by Synthetic Products.
[5]Hycar ™ 1300 × 24 sold by The B. F. Goodrich Company.

The cured sign 10 had the following composition:

| | Percent by Weight |
|---|---|
| Resin binder | 48.33% |
| Rovings | 50.23 |
| Scrim | 0.69 |
| Surface veil | 0.75 |
| | 100.00% |

Further information about the particular composition of the sign 10 is available in copending, commonly owned U.S. patent application Ser. No. 07/148,813 entitled "Pultruded Fiber Reinforced Plastic Marking Devices", filed Jan. 27, 1988, now U.S. Pat. No. 4,812,343.

The sign panel 36 of this example is made of a white paper which allows good print definition and which is saturable with the resin. The paper from which the sign panel 36 is made is also permeable to allow for the escape of gases as the resin sets up and cures. A preferred type of paper which has been found to perform well is grade 813-PBS paper available from Mead Paper, Specialty Paper Division, South Lee, Massachusetts, which has the following characteristics:

Basis weight: 29 lb.
Caliper: 0.0065
Disc cure: 3′00″
Wet tensile, EOM: 700+
Densometer: 12
Klemm: 25

The above described combination of components when constructed using the pultrusion process has been found to produce a sign 10 which has good quality encapsulated identification matter. The sign 10 as thus produced can be implanted in the ground by impacting its top end using a special driver tool which supports the sign 10 against buckling. When partially buried about 18″ in the ground, the sign 10 can return to its original upright position without damage after it is driven over by a vehicle. The pultrusion process has been found to wet out the longitudinally continuous fibrous components of the sign 10 especially well to form strong bonds between the fibrous components and the resin. The strength of these bonds is important when the sign 10 is subjected to an extreme bending stress such as when it is driven over by a vehicle.

EXAMPLE 2

A specific embodiment of the sign 70 of the invention was made as described above and using the same materials, compositions and dimensions as described in Example 1. In the sign 70, the sign panel 36 was attached to the exterior surface of the veil 32 using the described weld line pattern with eighteen longitudinally oriented weld lines 72 spaced evenly apart across the width of the sign panel 36. After the sign 70 exited the die 17, but while it was still warm, a layer of acrylic lacquer approximately 0.001 in. thick was sprayed over the viewing surface in the area of the sign panel 36. The particular lacquer used is sold under the trade designation Hetrolac 105 by Ashland Chemical Company. This sign exhibited good weather resistance when subjected to weathering tests which simulated 7–10 years of normal service subjected to rain and sunlight.

Thus, the invention provides a composite sign made by a pultrusion process which includes a sign panel encapsulated within the resin binder of the sign. The sign panel is beneath the surface of the sign 10 and is not exposed to weathering, scratching or tearing. Furthermore, the identification matter on the sign panel, regardless of whether the sign panel is interior or exterior of the outermost longitudinally continuous component, is highly legible making it possible to display small or fine indicia and detailed graphics in a sign of the invention. The sign panels can also be printed using conventional printing equipment, obviating very large diameter print wheels which would otherwise be necessary for long signs or print repeat lengths.

We claim:

1. A composite sign, comprising:
    a longitudinally continuous component layer beneath a viewing surface of the sign and extending from one end of the sign to the opposite end of the sign; said longitudinally continuous component layer including:
        (a) a discrete sign panel which is made of a printable sheet material and which bears identification matter which faces the viewing surface; and
        (b) a fibrous component affixed to said sign panel;
    wherein said sign is made by pulling said longitudinally continuous component layer of the sign through a resinous component and through a forming die in which said resinous component of the sign sets up; and
    wherein said longitudinally continuous component layer is encapsulated by the resinous component of the sign in the die with the identification matter visible from the viewing surface.

2. A sign as in claim 1, wherein the sign panel is affixed against an interior surface of the fibrous component, said interior surface being on the side of said fibrous component which is opposite from the viewing surface of the sign.

3. A sign as in claim 2, wherein said fibrous component is longitudinally continuous, extends over the sign panel between the sign panel and the viewing surface, and is a fibrous surface veil of a weight and texture to provide a resin-rich viewing surface for the sign and form a translucent composite layer over the sign panel.

4. A sign as in claim 2, wherein said fibrous component and the sign panel are in discontinuous sections, said sections being affixed to one another to make the first longitudinally continuous component.

5. A sign as in claim 4, wherein said fibrous component has at least one end which is affixed to an end of the sign panel.

6. A sign as in claim 1, wherein said fibrous component and the sign panel are in discontinuous sections, said sections being affixed to one another serially in alternating fashion to make the first longitudinally continuous component with only resin between the identification matter of the sign panel and the viewing surface of the sign, one of said sections having a trailing edge affixed against an exterior surface of the adjacent section, said exterior surface being on the side of said adjacent section which faces the viewing surface of the sign.

7. A sign as in claim 6, wherein the fibrous component is in two sections with the sign panel between said two sections, one of said two sections having a trailing edge which is affixed against an exterior surface of the sign panel, said exterior surface being on the side of said sign panel which faces the viewing surface of the sign.

8. A sign as in claim 1, wherein the sign panel is affixed to the fibrous component against an exterior surface of said component, said exterior surface being on the side of said component which faces the viewing surface of the sign.

9. A sign as in claim 8, wherein the fibrous component is a fibrous mat.

10. A sign as in claim 8, wherein a second longitudinally continuous component layer is between the sign panel and the viewing surface of the sign, said second component layer being translucent when it is suspended in the cured resin.

11. A sign as in claim 8, wherein said fibrous component is a longitudinally continuous fibrous component layer which is the outermost longitudinally continuous fibrous component layer of the sign.

12. A sign as in claim 11, wherein said fibrous component is a fibrous surface veil.

13. A sign as in claim 1, 4, 6, 8 or 11, further comprising a protective transparent layer over the resin of the sign in the area of the sign panel.

14. A sign as in claim 1, 2, 6 or 8 wherein the sign panel is made of a permeable sheet material to allow gases to escape through it from inside the sign as the resin sets up.

15. A sign as in claim 1, 2, 6 or 8, wherein the sign panel is sonically welded to the longitudinally continuous fibrous component.

16. A sign as in claim 1, wherein the sign panel has a leading edge which is secured to the fibrous component.

17. A sign as in claim 16, wherein the leading edge of the sign panel is secured to the fibrous component by a series of ultrasonic welds which overlap the leading edge of the sign panel.

18. A sign as in claim 1, wherein the sign panel is made of a material which saturates with the resin.

19. A sign as in claim 18, wherein the material from which the sign panel is made is white paper which saturates with the resin and is printed with the identification matter.

20. A sign as in claim 18, wherein a background is printed on the sign panel to define identification matter within the background, which identification matter is the color of the resinous component of the sign.

21. A sign as in claim 1, wherein the sign panel has leading and trailing edges and is affixed to the longitudinally continuous fibrous component adjacent to said edges.

22. A sign as in claim 1, wherein the sign panel is affixed in position on the longitudinally continuous fibrous component by a heat seal material which melts at a temperature at or above the temperature of the resin at the gel point in the die.

23. A sign as in claim 1, wherein the sign has identification matter on each of at least two sides, which identification matter is defined by one or more sign panels attached to the first longitudinally continuous fibrous component, said first component being folded along its length to display said identification matter on said sides of the sign.

* * * * *